United States Patent [19]

Hileman

[11] 3,749,893
[45] July 31, 1973

[54] VEHICLE NAVIGATION SYSTEM
[76] Inventor: Dale Hileman, 3387 Livonia Way, Los Angeles, Calif. 90034
[22] Filed: Dec. 22, 1971
[21] Appl. No.: 210,804

[52] U.S. Cl............. 235/150.27, 235/189, 340/24, 346/8, 235/151.11
[51] Int. Cl. ........................................ G06f 15/50
[58] Field of Search................. 235/150.2, 150.26, 235/150.27, 189, 197; 340/24, 73; 346/8, 13; 307/236; 343/11 R, 112 C, 112 PT

[56] References Cited
UNITED STATES PATENTS

| | | | |
|---|---|---|---|
| 3,141,725 | 7/1964 | Gray | 346/8 |
| 3,631,233 | 12/1971 | McKenna | 235/186 |
| 3,441,747 | 4/1969 | Van Dine | 307/236 |
| 3,359,408 | 12/1967 | Briggs | 235/150.27 |
| 3,392,448 | 7/1968 | Rock | 346/8 X |
| 3,688,252 | 8/1972 | Thompson | 340/24 |
| 3,457,394 | 7/1969 | Grado | 235/197 X |
| 3,453,624 | 7/1969 | Rockey | 235/150.27 X |

Primary Examiner—Eugene G. Botz
Assistant Examiner—Jerry Smith
Attorney—Samuel Lindenberg et al.

[57] ABSTRACT

A system for continually updating the Cartesian coordinates of a land vehicle on a map or graph, employing: a compass and shaft encoder for continually producing a heading code; and a pulse generator coupled to the vehicle drive system to continually produce a train of pulses representing distance traveled. A digital resolver effectively multiplies the train of pulses by the sine and cosine of compass heading to produce two trains of pulses representing vector components of the distance traveled in a Cartesian coordinate system. These two trains are continually integrated by mechanical plotting means operated by reversible motors receiving the two trains. Encoders may be coupled to the mechanical plotting means to derive, in digital form, coordinates which may be transmitted by radio to a remote location for plotting.

11 Claims, 9 Drawing Figures

TABLE I
COMPASS ENCODER

TABLE II
PULSE-GENERATOR OR DISTRIBUTOR ENCODER

QUADRATURE PHASE TO NON-GATED MOTOR INPUT

BLANK READOUT SIGNALS, START OF NEW CYCLE

FIG. 2

TO MOTOR REVERSING TRANSISTORS Q₁ and Q₂ (FIG. 5)

INVENTOR.
DALE HILEMAN
BY
Lindenberg, Freilich & Wasserman
ATTORNEYS

VEHICLE NAVIGATION SYSTEM

BACKGROUND OF THE INVENTION

The present invention relates to land vehicle position plotters, and more particularly to a system for continually updating the Cartesian coordinates of a land vehicle position for display on a map or graph.

In many different applications, it would be desirable to employ a relatively inexpensive system in a land vehicle to so position an indicator or recording stylus on a chart or map in response to navigational data as to continually display the vehicle's position relative to some starting point. For example, it is often desirable to plot roads on a topographical map of a wilderness area. Standard techniques of surveying often take too long for the purpose at hand. Aerial photography is much faster, even though a number of process steps are required, but quite often the roads are obscured from the air by vegetation, or by lack of contrast, as in the desert. In either case, the technique is expensive in both equipment and labor.

Still other applications for inexpensive vehicle-position plotters will readily suggest themselves. For example, a plotter in every metropolitan police officer's vehicle would be helpful in achieving maximum effectiveness from a limited force. It would continually display the position of a given vehicle on a map or would simply transmit the Cartesian coordinates as a pair of numbers, one representing the X position and the other the Y position which would then be displayed on a map at a central station. While the police officer in the vehicle may not be particularly interested in a position plotter, since he will always know his position in his assigned area from familiar surroundings and may seldom be dispatched outside of it, a dispatcher at a remote location would be extremely interested in having the position of police vehicles continually displayed. That could be easily done by continually transmitting the plotter's coordinates for display on a cathode ray tube or solid-state light-emitting system having an overlay of the city or area map. To identify a given one of several vehicles, the transmitter in the vehicle may employ a modulator to superimpose a unique code on the coordinate data. Once the data is received, and the code is identified, standard techniques may be employed to display the vehicle's position using a unique symbol for the particular vehicle. A programmed digital computer can be used to properly coordinate the display data with a map overlay. For example, a given vehicle may be periodically interrogated as to its true map coordinates for plotting the vehicle's position as it moves in the area. Those coordinates could be transmitted orally by the driver of the vehicle or transmitted automatically from a plotter. The driver can upon interrogation from time to time reset the plotting device to the vehicle's true position on the map using visual aids to identify the vehicle's position. Because of the relatively slow speed of vehicles, a large number of vehicles can be tracked simultaneously using standard multiplexing techniques.

The possibilities for a land vehicle plotter are almost without limit, once reasonably accurate position coordinates are developed in the vehicle. However, the feasibility of these possibilities depends upon the availability of a reasonably inexpensive and accurate plotting system which is compact, easy to install and easy to maintain.

In the past, vehicle plotting systems have been suggested using an arrangement for receiving an analog input of velocity (distance) from a speedometer (odometer) cable and an analog input of heading from a gyro compass. An analog computer comprised of a mechanical resolver continually transforms these analog inputs from polar to Cartesian coordinates for positioning an indicator on a map or graph. However, these mechanical resolvers are complex and expensive units using either cams or a ball. Such mechanical systems tend to be unreliable, especially with the vibration and acceleration encountered in most vehicles. An all electronic resolver could be devised using standard analog circuits but the transformation from one system of coordinates to another would be less accurate and the costs of production and maintenance would be higher. Accordingly, an object of this invention is to provide an inexpensive plotting system, using a resolver having greater accuracy than in the past, i.e. having an accuracy better than can be expected from systems which have been suggested in the past.

SUMMARY OF THE INVENTION

Briefly, a system for continually updating the Cartesian coordinates of a land vehicle on a map or chart is provided for a land vehicle using a compass means for producing a unique code signal in digital form representing the heading of the vehicle, and a pulse generating means for producing a train of pulses, each pulse representing an increment of distance traveled. The pulses (increments of distance traveled) on a given heading are resolved into east-west and north-south pulses (components) for plotting by employing the unique heading code to so control sine-cosine pulse-rate multiplying means that the pulse train representing distance is resolved into two pulse trains according to the following equations:

$$\Delta X = \Delta D \sin \theta \tag{1}$$

$$\Delta Y = \Delta D \cos \theta \tag{2}$$

where $\theta$ is the heading, $\Delta D$ is the number of pulses generated, $\Delta X$ is the number of desired east-west pulses and $\Delta Y$ is the number of desired north-south pulses. The $\Delta X$ and $\Delta Y$ pulse trains are applied to respective ones of a pair of two-phase reversible stepping motors which drive mechanical means for positioning a plotting device according to the Cartesian coordinates of the distance traveled by the vehicle along its heading.

According to one feature of the invention, the pulse generating means is comprised of a shaft encoder coupled to the drive shaft of the vehicle by a suitable gear train to produce a unique cyclic code constituting separate pulse trains at different rates in terms of pulses per revolution of the shaft encoder. The pulse-rate multiplying means is then comprised of logic gates controlled by the heading code from the compass means to transmit selected ones of the separate pulse trains which, upon being summed by OR gates, provide the $\Delta X$ and $\Delta Y$ pulse trains according to Equations (1) and (2).

According to a further feature of the invention, the stepping motor is a two-phase synchronous inductor motor and the shaft encoder of the pulse generating means produces an out-of-phase pulse train synchronized with the separate $\Delta X$ and $\Delta Y$ pulse trains for use as one input to the two phase synchronous inductor motor. The pulse train applied to the other input of the motor is of one polarity or another according to the quadrant of the heading as determined from the heading code.

Still another feature involves compensating for magnetic compass error due to distortion of the earth's magnetic field due to the ferrous mass of the vehicle. Using one permanent magnet, it is possible to easily correct the magnetic compass error to the extent that the plotting device used will produce consistently parallel lines while the vehicle is traveling on east and west headings, and on north and south headings. However, if the vehicle travels in a rectangle, the plot may very likely be a rhomboid. To produce a rectangular plot, and thus complete the correction of the magnetic compass error, cursors for guiding the east-west and north-south motions of the plotting device are angularly offset by angles equal, but opposite, the angles by which the east-west and north-south plots depart from the X and Y axes of the plotting device.

These and other features of the present invention are set forth with particularity in the appended claims.

The invention will best be understood from the following description when read in conjunction with the accompanying drawings.

DESCRIPTION OF THE PREFERRED EMBODIMENTS

The organization and operation of an exemplary embodiment of the present invention will first be described with reference to FIG. 1. A more detailed description of this embodiment will then be described with reference to the remaining figures.

Figure 1:
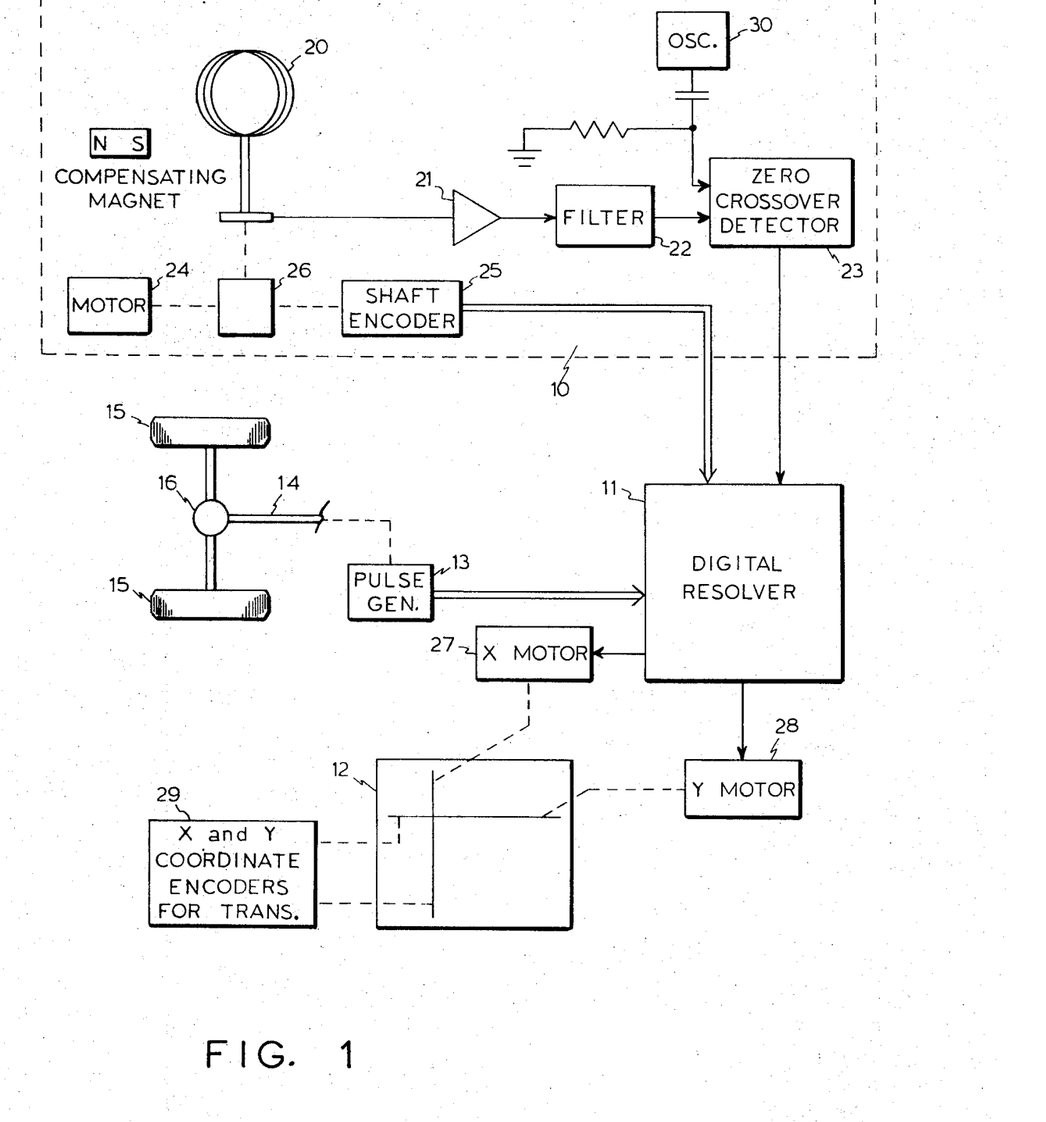
FIG. 1 is a general block diagram of an exemplary embodiment of the invention.

Referring now to FIG. 1, a digital navigation or position plotting system especially adapted for land vehicles, such as cars and trucks, is comprised of a rotating magnetic compass 10 which can provide as high a degree of resolution and accuracy as may be desired. The compass periodically transmits to a digital resolver 11 a heading code according to Table I of FIG. 2 for use in resolving a train of pulses $\Delta D$, representing distance traveled along a vector at the given heading, into two trains of pulses $\Delta X$ and $\Delta Y$, representing vector components along X and Y coordinates of a plotting device 12. These components correspond to east-west and north-south directions on a chart or map placed on the recording device if there is no magnetic error, as will be more fully described hereinafter. The number of pulses $\Delta D$ produced in a given period represents the distance traveled in that period. These pulses are developed by a pulse generator 13 coupled to a drive shaft 14 of a vehicle, not shown except for wheels 15 driven by the drive shaft through a differential gear 16.

The manner in which the pulse generator is implemented may take many forms. In each case, the drive for the pulse generator may be a shaft having one end connected directly to the speedometer or odometer output coupling in the transmission housing. The speedometer cable is then coupled to the other end of the shaft. The shaft rotates a cam or cams to operate switches, or rotates a worm gear to turn a shaft encoder or rotary switch. The shaft may even drive a two-phase alternator which, through squaring (saturating) amplifiers, produces two out-of-phase pulse trains at a frequency proportional to velocity of the vehicle. Still other implementations will occur to those skilled in the art such as reed switches closed by magnets rotated past the switches by the vehicle drive shaft.

The compass 10 is comprised of a rotating magnetic sensor 20 which may be a Hall-effect semi-conductor device, or any other magnetic field sensitive device, such as a simple loop of wire as shown, to periodically sweep the earth's magnetic field and, in response thereto, to generate a sinusoidal signal. That signal is applied through an amplifier 21 and filter 22 to a zero-crossover detector 23. That detector may be a Schmitt trigger circuit or other level sensitive or phase sensitive circuit that will change a sinusoidal signal to a pulse having a fixed time relationship to the azimuth of the sensor 20. For example, the pulse produced may be adjusted to occur when the plane of a loop sensor is passing either a magnetic north heading or a true north heading by a phase shift adjustment in the filter 22 to correct for magnetic declination or by an adjustment of the relative angular positions of sensor 22 and shaft encoder 25.

The filter 22 is used to remove undesired signals from the sinusoidal output of the sensor 20. It is shown as a separate functional block, but will in practice be implemented as part of the amplifier in the usual manner. The amplifier 21 may be coupled to the sensor 20 through a slip ring, but to avoid commutating noise, an inductive coupling is preferred of the type shown at page 184 of *Instrumentation in Scientific Research* by Kurt S. Lion, and published by McGraw Hill Book Company, Inc. (1959). Other coupling means, including RF, ultrasonic, capacitive, etc., which are well known in the art may also be employed.

A motor 24 drives the sensor 20 and a shaft encoder 25 through a suitable gear box 26 or other drive mechanism. By relating the phase of the sinusoidal signal from the sensor 20 to a 6-bit code from the encoder 25, the resolver 11 effectively receives vehicle heading information. For example, suppose the zero-crossover detector 23 generates a pulse once per rotation of the sensor, i.e. once per cycle of the sinusoidal signal from the sensor; the 6-bit code read out of the shaft encoder 25 at that time will correspond to the heading of the vehicle. That code is preferably a Gray code to avoid ambiguity when the actual heading of the vehicle is on the border between two discrete heading codes.

Ideally, 360 discrete heading codes would be provided on the shaft encoder 25 to resolve the heading of the vehicle to within one degree, but that would add to the expense of the encoder and to the complexity of the resolver 11. Therefore, the encoder is, in practice, provided with 32 discrete codes, each corresponding to 11° 15'. At the instant a pulse from the zero-crossover detector 23 occurs, a 6-bit word is read from the encoder 25 into the resolver 11 where it is stored until a new heading code is read at the end of the next cycle of the sinusoidal signal from the sensor 20.

Figure 2:
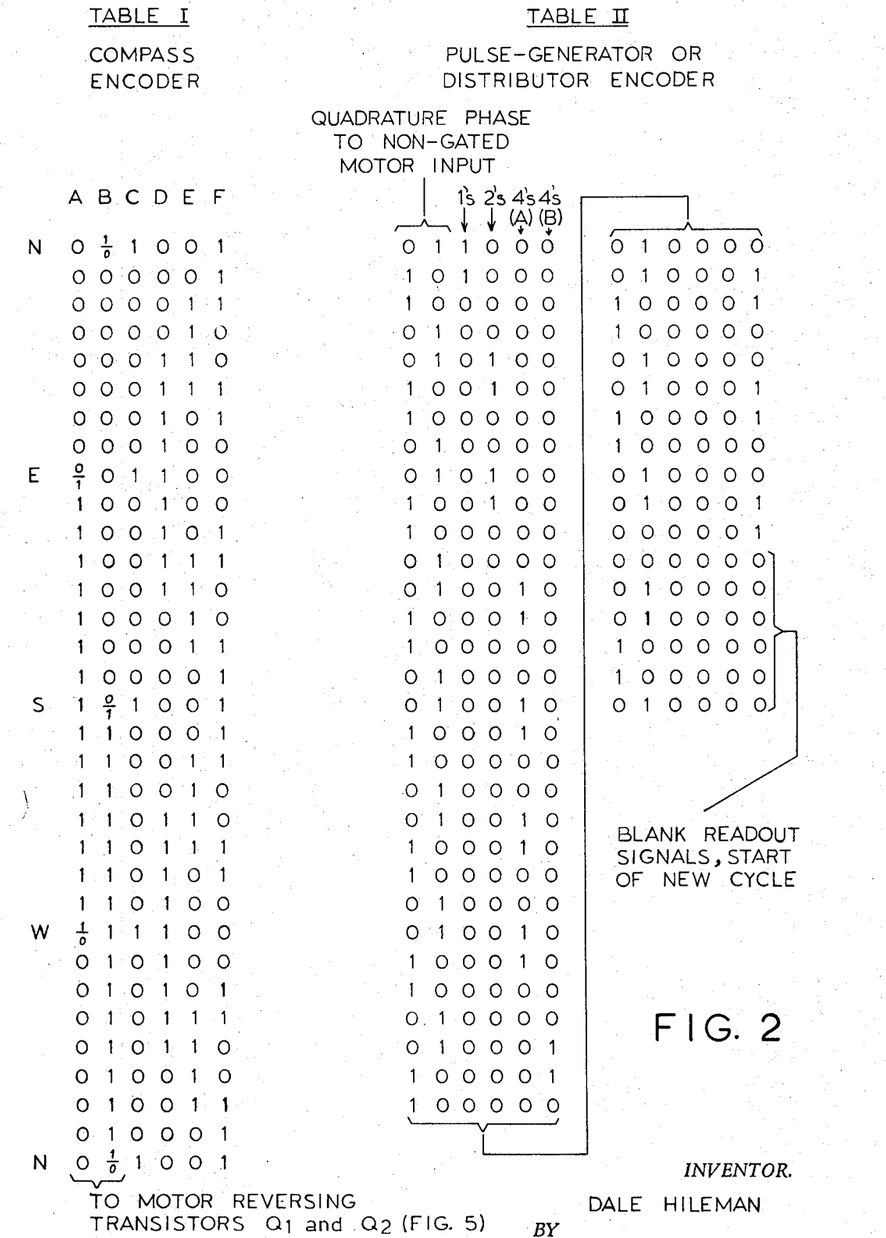
FIG. 2 illustrates in respective tables I and II a compass encoder code and a shaft encoder code for the exemplary embodiment of FIG. 2.

It should be noted that a 5-bit heading code would be sufficient for 32 discrete words, but a 6-bit code is employed as shown in Table I of FIG. 2 in order to simplify implementation of the resolver 11. The first two bits in each word under columns A and B are employed to determine the direction in which drive motors 27 and 28 are to be operated in the respective X (east-west) and Y (north-south) directions for continually plotting the position of the vehicle. In that regard it should be noted that the shaft encoder continually transmits a bit 0 for northerly headings between 90° and 270°. At the same time, the compass shaft encoder transmits a binary 0 for easterly headings between 0° and 180°, and a binary 1 for westerly headings between 180° and 270°. Therefore, the X (east-west) motor should be driven in a positive direction when the B-bit is zero and in a negative direction at all other times. Similarly, the Y (north-south) motor should be driven in a positive direction when the A-bit is a zero, and in a negative direction at all other times.

The C column of the 6-bit code of the compass shaft encoder is a bit 1 for a sector of 11° 15' centered at each of the cardinal headings north, east, south and west. The 4-bit codes for the 16 sectors from north to south under the columns, C, D, E and F are numbered in order according to a Gray code from a sector centered on a northerly cardinal heading through a sector centered on the easterly cardinal heading, and in inverse order for the sectors from the easterly cardinal heading through a sector centered on a southerly cardinal heading. This is appropriate if the headings represented by these Gray codes are to be used for resolving a distance vector from a polar coordinate system to a Cartesian coordinate system for angles from 0° to 180°. The ambiguity in the Y component is quite obviously resolved by the bit in the A column.

The code pattern is repeated from the sector centered on the southerly cardinal heading through the westerly cardinal heading to the sector centered on the northerly cardinal heading. Again, ambiguity in the Y direction is resolved by the bit in the column A. Ambiguity in the X direction is resolved by the bit in the column B. In that manner, the 4-bit codes taken from columns C, D, E and F of the compass shaft encoder may be used to resolve distance travelled by the vehicle in any direction into X and Y components while the 2-bit code in columns A and B automatically indicate the signs of the vector components, i.e. indicate the direction in which the respective X and Y motors are to be driven. Since only 1 bit changes as heading changes from one sector to another in the Gray code of columns C, D, E and F, ambiguity is avoided when the vehicle heading is on the border between two discrete sectors.

The pulse generating means 13 is comprised of a shaft encoder coupled to the drive shaft or axle of the vehicle. It produces in one revolution the sequence of 6-bit codes shown in Table II. The first two columns are employed to produce two square wave signals in phase quadrature with the signals of the remaining flow columns and are used in the preferred embodiment of FIG. 4 to excite field windings of the X and Y motors 27 and 28 of the plotting device 12 shown in FIG. 1. The remaining four columns of Table II for the pulse-generator shaft encoder are headed 1's, 2's, 4's(A) and 4's(B). In the 1's column, two successive binary digits produce a square pulse in phase quadrature with both of the square waves derived from the first two columns, but only once in a single shaft revolution. The 2's column provides two such pulses and the 4's(A) column provides four such pulses in a single revolution, all in sequence. Following that, the 4's(B) column produces another set of four equally spaced square pulses in sequence, after which all columns are zero, except the first two columns. These zero codes are not essential, and may be omitted, but are useful for having a distinct null period in each cycle of the pulse generator encoder for system test purposes.

If the 1's, 2's, 4's(A) and 4's(B) were to be produced separately and then combined through an OR gate, the result would be a single train of pulses equal to the sum of the separate trains of pulses, a total of 11 pulses for each revolution of the pulse generator shaft encoder. The choice of having the 11 pulses in four separate trains is for convenience only in implementing the digital resolver 11.

This choice of 11 pulses for one revolution of the pulse generator shaft encoder is selected to facilitate resolving the $\Delta D$ pulses into $\Delta X$ and $\Delta Y$ pulse trains as a function of the compass heading code.

For example, if a compass shaft encoder indicates a northerly heading, i.e., a heading of 0° − 5° 37' 30", all of the possible 11 pulses are transmitted to the Y motor, and none to the X motor. As the heading increases to 90°, ± 5° 37' 30", progressively more pulses are gated to the X motor and less to the Y motor. That is shown diagrammatically in FIG. 3. During the second quadrant, the pulses gated to the Y motor are increased. The entire pattern repeats itself for the third and fourth quadrants. How many pulses are gated to the X motor and the Y motor at any given time by combining various ones of the four trains of pulses is determined by the heading code.

It should be kept in mind that although the present invention is being illustrated with a plotting device, the X and Y motors may be replaced by integrating pulse counters for digital position read-out for transmission to a control station. If a plotting device is used, such an integrating counter may be used, but to provide a digital position read-out for transmission it is preferably to provide X and Y coordinate converters linked to the cursors of the plotting device, as shown by a functional block 29 in FIG. 1, that enables the driver of the vehicle to correct the X and Y read-out automatically upon repositioning the cursors, placing the stylus at the intersection of the cursors over a position visually determined by landmarks to be correct.

Figure 3:
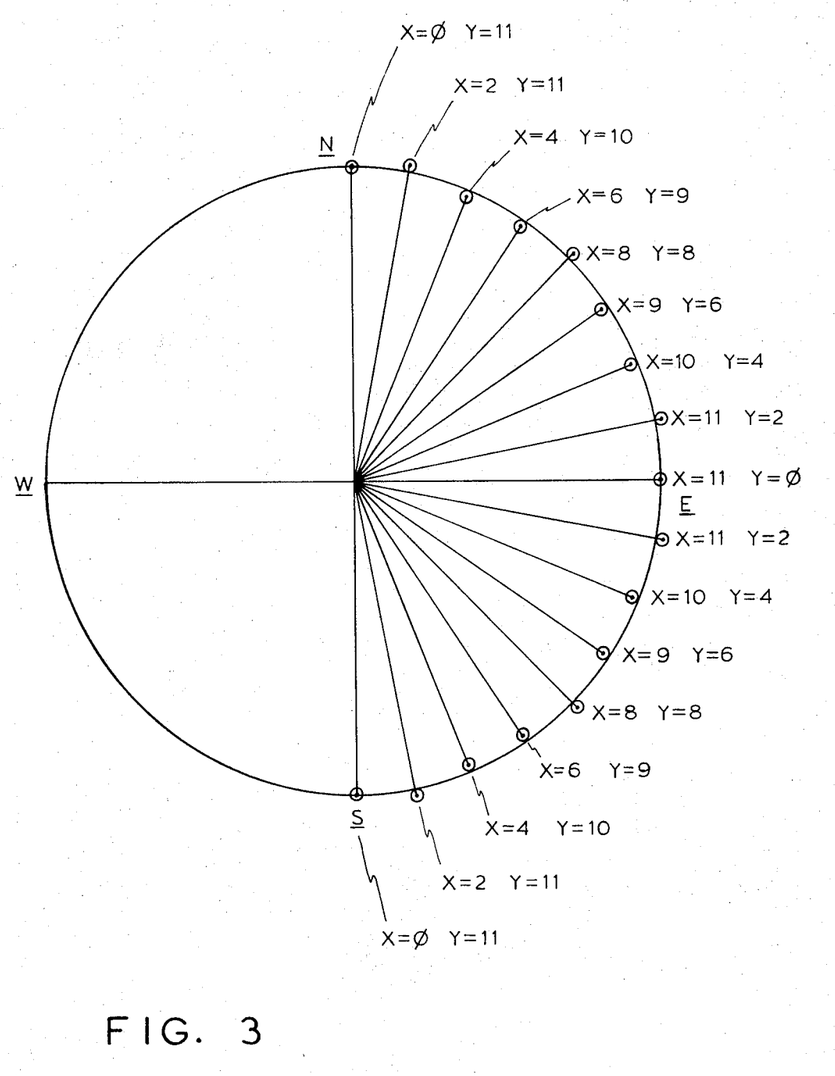
FIG. 3 illustrates diagrammatically the manner in which shaft encoder pulses representing distance travelled are resolved into two pulse trains in accordance with a compass encoder code representing heading to provide drive pulses to two orthogonally oriented motors in an X-Y plotter.
Figure 4:
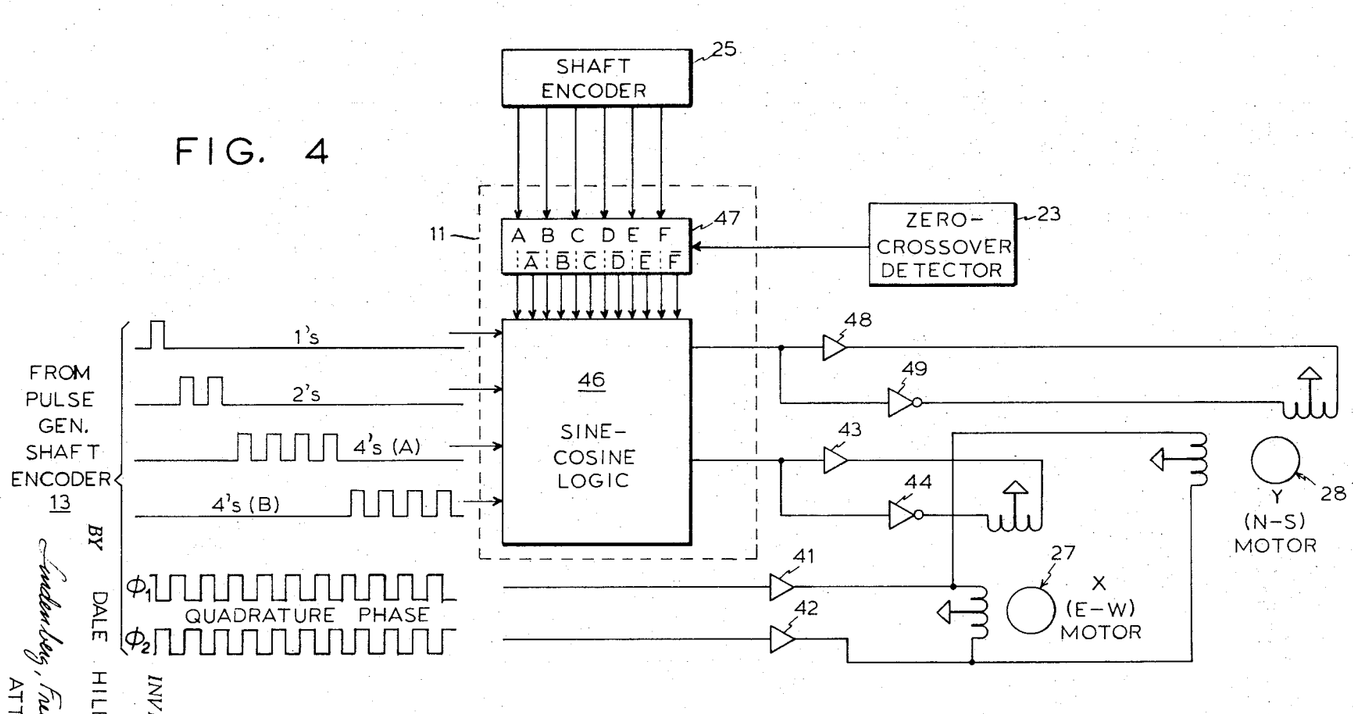
FIG. 4 is a schematic diagram of the exemplary embodiment of FIG. 1.
Figure 5:
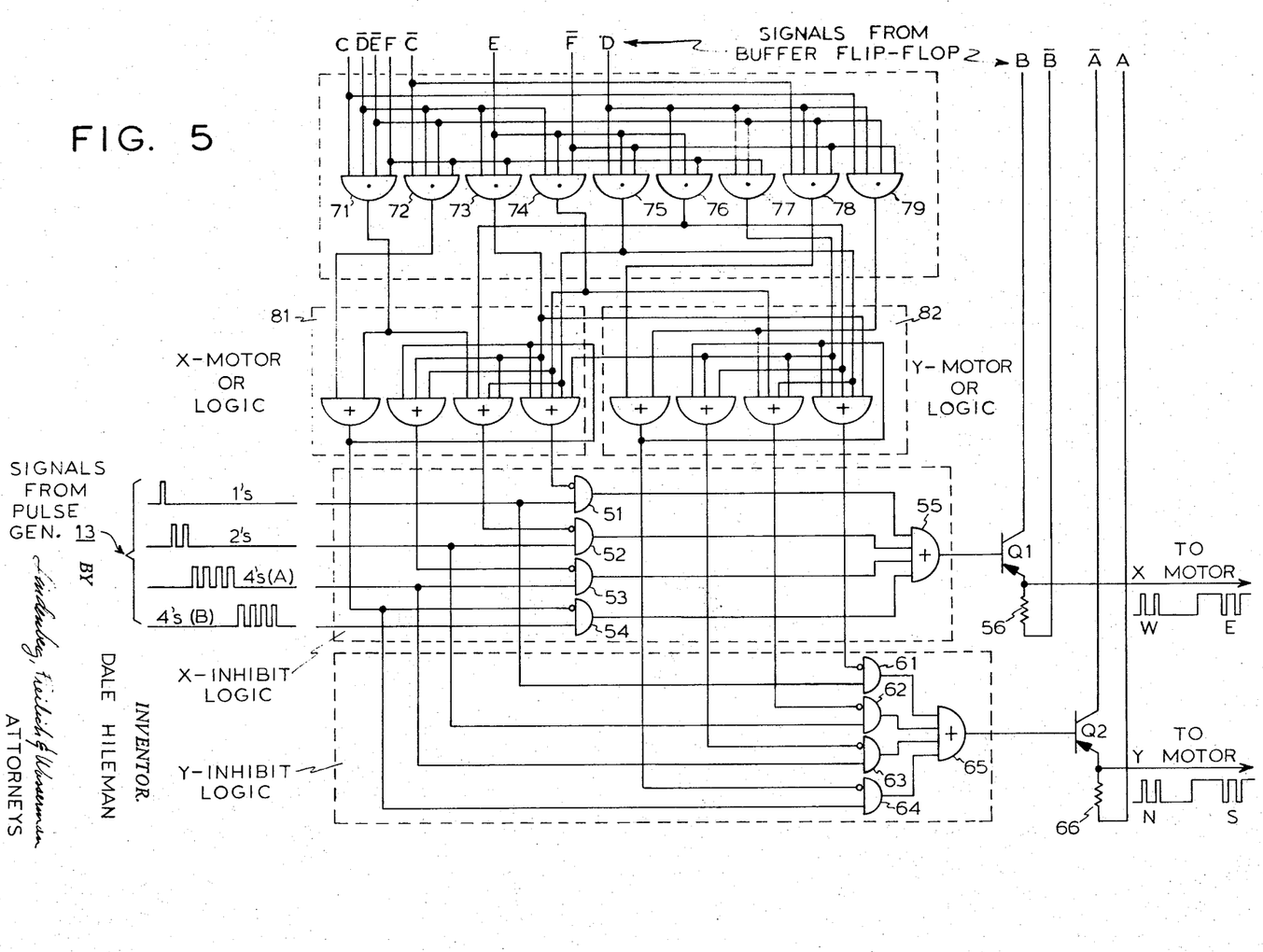
FIG. 5 is a logic diagram for a sine-cosine resolver in the system of FIG. 4 to achieve the results illustrated in FIG. 3.

From the diagram of FIG. 3 it may be seen that the number of pulses gated during each cycle to the respective X and Y motors according to the pattern indicated will yield a very close estimate of the true X and Y components of any distance travelled as the four trains of pulses are being cyclically produced by the pulse generator 13. However, in its broadest aspects, the present invention is not limited to this particular scheme. Accordingly, this scheme, which will be more fully described with reference to FIGS. 4 and 5, is by way of example, and not by way of limitation. Some alternative systems may yield more precise conversion from polar to Cartesian coordinates. However, for land vehicles, such alternative systems cannot be justified because in practice the vehicle will be so continually changing direction that distance error present in this technique will be averaged, and not accumulated.

It should be recognized that unless the vehicle is proceeding along a heading corresponding to the center of the arc represented by a code word from the compass shaft encoder, i.e. along one of the directions shown in the diagram of FIG. 3, the position plotted for the vehicle may be in error by as much as 5° 37' 30". This heading error is inherent in this digital system because heading resolution has been purposely limited (by the number of bits in the code word from the compass shaft encoder) in order to minimize the cost and complexity of the compass shaft encoder and the digital resolver. However, this heading error will be averaged, as will the distance error, in converting the polar coordinates into the X and Y components of distance if the vehicle is continually changing heading. For example, on a typical mountain road, the heading is continually and randomly changing with the result that the track of the vehicle will be quite accurate.

In special cases, this heading error will not average to zero, such as on a long straight road, unless the driver purposely weaves back and forth, a practice which is neither safe nor practical. Accordingly, to cause the heading to vary so the error will "average", even on a straight road, the output from the compass shaft encoder may be effectively phase modulated to simulate electronically the effect of the driver weaving back and forth across a straight path. That is preferably accomplished with a low frequency sinusoidal signal from an oscillator 30 (FIG. 1) to modulate the sensor signal in the zero-crossover detector 23 so that part of the time the output pulse from the zero-crossover detector 23 will fall within the arc represented by the nearest adjacent sector from the compass shaft encoder.

If the amplitude of this phase modulation is adjusted so that the occurrence of the pulse from the zero-crossover detector is continually advanced and retarded by 5° 37' 30", The azimuth error should cancel exactly. For example, suppose the vehicle is driven on a heading of 1°. The pulse from the zero-crossover detector will occur repeatedly at such a time as to cause the compass shaft encoder to be read out while it is transmitting the code 001001, which will cause the track of the vehicle to be plotted along a heading of 0°. However, when the output signal from the compass sensor is phase modulated by ± 5° 37' 30" the pulse from the zero-crossover detector will occur alternately on the heading codes of 0° and 11° 15" so that the heading of the vehicle is seemingly changing back and forth across the true heading. If the phase modulation is fairly linear in time, then the heading code for 0° will be in effect about 90 percent of the time and the code for 11° 15" will be in effect about 10 percent of the time, resulting in an average track very close to 1°. The plotted path of the vehicle will thus appear as an essentially straight line along a heading of 1°.

The frequency of the phase modulation should be slow enough to minimize loss of motor drive pulses that may occur at the transition from one sector to the next but fast enough to render imperceptible the "tacking" action in the track delineated by the plotting device 12. The phase modulating signal from the oscillator 30 is preferably AC coupled to zero-crossover detector, as shown, to avoid any DC offset error, and the zero-crossover detector is preferably a high-gain differential amplifier which passes through zero and quickly saturates as the input from the filter 22 crosses over zero from one polarity to the other.

It should be appreciated that the arrangement of the oscillator 30 and zero-crossover detector 23 is merely one example of how phase modulation can be achieved to average azimuth error. Other techniques for achieving the same result will occur to those skilled in the art. For example, the oscillator 30 could be used to drive a vibrator, solenoid, motor or other electromechanical actuator coupled to the housing of the shaft encoder 25, so as to cause it to be continually rocked on its axis across an arc of 11° 15'. Still another possibility is to mount the entire compass on a mechanical pivot and causing the compass to be swung back and forth through a total arc of 11° 15' by an electromechanical actuator. Yet another possibility is a differential arrangement for the drive gear 26 which permits the speed at which the shaft of the encoder is driven to be varied, so that the phase relationship of the encoder shaft to the shaft of the sensor 20 may be continually advanced and retarded by 5° 37' 30". The same effect may be achieved electronically by applying the output of the oscillator to voltage variable elements in the filter 22 which will cause a cyclic phase shift in the output signal from the sensor 20. In short, any scheme by which the phase relationship of the sensor shaft to the heading encoder shaft is made to oscillate periodically will produce the desired averaging of the heading error. That may even take the form of some resilinent coupling in either the sensor shaft or the encoder shaft with a "hard spot" in each revolution of the shaft to cause mechanical oscillations in the shaft. This technique may also take the form of oscillations in the drive mechanism between the shaft of the compass and the shaft of the encoder due to "poor" mechanical design of the drive coupling.

A preferred embodiment of the digital resolver 11 utilizing the codes of Tables I and II will now be described with reference to FIGS. 4 and 5. Referring first to FIG. 4, it may be seen that the two-phase synchronous induction (reversible stepping) motors 27 and 28 of the plotting device 12 (FIG. 1) are driven by pulses from the pulse generator using the first two columns of Table II for the quadrature phase signals $\phi_1$ and $\phi_2$ applied to field windings of each of the motors through amplifiers 41 and 42. Each of the field windings are continuous windings connected at the center to circuit ground and driven at opposite ends by the amplifiers 41 and 42 in a "push-pull" manner so that the polarity of the fields produced will alternate. The second winding of each motor is similarly driven in a "push-pull" manner by $\Delta X$ or $\Delta Y$ pulses. For example, $\Delta X$ pulses drive the second field winding of the motor 27 through two amplifiers 43 and 44. Of these two, only the amplifier 44 is an inverting amplifier. For driving the X motor 27 in a positive direction, the phase of the $\Delta X$ pulses derived from shaft encoder pulses ($\Delta D$) are of a given phase. For driving the X motor in the opposite (negative) direction, the phase of the $\Delta X$ pulse is changed to the opposite phase, i.e. is shifted 180°. That is done by merely inverting each of the $\Delta X$ pulses in sine-cosine logic 46.

The $\Delta X$ and $\Delta Y$ pulses are derived from the shaft encoder pulses by the digital resolver 11 through the sine-cosine logic 46 in accordance with Equations (1) and (2) in the manner illustrated in the diagram of FIG. 3. To accomplish that, each time a pulse is transmitted by the zero-crossover detector 23 (FIG. 1), the 6-bit code from the compass shaft encoder 25 (FIG. 1) is gated into a bank of flip-flops 47, such as D-type flip-flops. The true and false output terminals of each flip-flop, such as the terminals A and $\overline{A}$ of the flip-flop storing the binary digit of column A in Table I, are connected to the sine-cosine logic in order that pulses at the respective 1's, 2's, 4's(A) and 4's(B) may be combined at the respective $\Delta X$ and $\Delta Y$ output terminals according to the scheme diagrammatically illustrated in FIG. 3. For example, assuming a heading of 33°, six input pulses to the sine-cosine logic are gated to the X motor while 9 pulses are gated to the Y motor during revolution of the pulse-generator shaft encoder. This is implemented by simply employing the heading code (000010) stored in the bank of flip-flops 47 to enable, or inhibit, selected gates to route pulses from selected terminals of the pulse-generator shaft encoder to respective ones of the $\Delta X$ and $\Delta Y$ output terminals. For example, to transmit six $\Delta X$ pulses, a gate coupling the shaft encoder terminals for the 2's and 4's(A) pulses to the amplifiers 43 and 44 are enabled while all other gates coupling the two other shaft encoder terminals to those amplifiers are inhibited. Simultaneously gates coupling the shaft encoder terminals for the 1's, 4's(A) and 4's(B) pulses to amplifiers 48 and 49 are enabled while a gate coupling the shaft encoder terminal for the 2's pulses to those amplifiers is inhibited.

FIG. 5 illustrates in a logic diagram an exemplary arrangement for the sine-cosine logic 46. Four inhibit gates 51 through 54 couple the 1's, 2's, 4's(A) and 4's(B) pulses to the X motor through an OR gate 55 and a PNP transistor $Q_1$. That transistor has a load resistor 56 in what is shown to be the emitter circuit to transmit uninverted X pulses combined by the OR gate 55 from the inhibit gates 51 through 54 according to the heading code. Inhibit gates 61 through 64 similarly couple the same input terminals of the sine-cosine logic to the $\Delta Y$ motor through an OR gate 65 and a PNP transistor $Q_2$ having a resistor 66 similarly connected in what is shown as the emitter circuit to transmit uninverted $\Delta Y$ pulses.

The emitter and collectors of the transistors $Q_1$ and $Q_2$ are connected to the true and false output terminals of the flip-flops storing the binary digit of each heading code shown in Columns B and A of Table II so that the $\Delta X$ and $\Delta Y$ pulses can be selectively inverted when the X or Y drive direction is to be negative. For example, if the heading of the vehicle is in a westerly direction, the transistor $Q_1$ will receive a bit-1 (−V) signal at the B terminal and a bit-U (Zero V) signal at the $\overline{B}$ terminal thus causing the transistor $Q_1$ to operate as an emitter follower (logic 1 being a negative voltage and logic $\phi$ being zero volts). It should be noted that the pulse polarities shown in FIG. 4 are opposite the usual convention, up being minus and down being zero.

When the digit from the column B of Table I is a binary 1, the polarities of the B and $\overline{B}$ terminals are reversed. The emitter of $Q_1$ now acts as a collector and the collector as an emitter, causing $Q_1$ to operate as an inverting amplifier. The transistor $Q_2$ is similarly caused to operate as an emitter follower when the binary digit from the column A of Table I is a binary 0, and as an inverting amplifier when the binary digit from column A is a binary 1. In that manner the first two columns of the compass shaft encoder output will control the direction of the X and Y motors according to the sign of the $\Delta X$ and $\Delta Y$ components as resolved by the sine-cosine logic 46. In other words, the transmitted $\Delta X$ pulses are negative going for westerly headings and positive going for easterly headings while the $\Delta Y$ pulses are negative going for northerly headings and positive going for southerly headings, all under the simple control of the first two digits of the heading code through the direct control of the transistors $Q_1$ and $Q_2$. Other motor reversing circuit arrangements could, however, be employed for each of the X and Y motors. Also, in the arrangement shown, the transistors $Q_1$ and $Q_2$ may be selected from either available PNP types or available NPN types, provided the reversal of operating logic levels is taken into consideration.

The remaining binary digits shown in Columns C, D, E and F of Table I are decoded by nine AND gates 71 through 79 to obtain control signals for selectively inhibiting the gates 51 to 54 and 61 to 64 through two banks of OR gates 81 and 82. For example, for the heading of 33° previously assumed, the AND gate 74 transmits a signal to inhibit the gates 51 and 53 for the $\Delta X$ pulses, and the gate 62 for the $\Delta Y$ pulses. The result is six pulses transmitted by the transistor $Q_1$ and nine pulses transmitted by the transistor $Q_2$ for each cycle of th pulse-generator shaft encoder 13. In that manner, for each sector of a quadrant, one of the AND gates 71 through 79 will transmit a signal to so inhibit transmission of shaft encoder pulses as to produce the desired $\Delta X$ and $\Delta Y$ pulses for that sector, as shown schematically by the diagram of FIG. 3.

To facilitate understanding and reading this logic diagram, consider that the gates 71 through 77 determine the conditions of the X equals 0, 2, 4, 6, 8, 9, and 10 situations, respectively, thus defining the conditions Y equals 11, 11, 10, 9, 8, 6, and 4, respectively. The last two gates 78 and 79 detect the $Y = 2$ and $Y = 0$ conditions thus defining the $X = 11$ condition for the last two headings in sequence from north to east in the diagram of FIG. 3. The same logic is then valid for all other quadrants. For the second quadrant the same but reverse sequence obtains, and for the third and fourth quadrants, the entire sequence of the first two quadrants if repeated. The difference from quadrant to quadrant is only in the signs of the X and Y components as determined by the first two columns A and B of the compass shaft encoder output shown in Table I.

Figure 6:
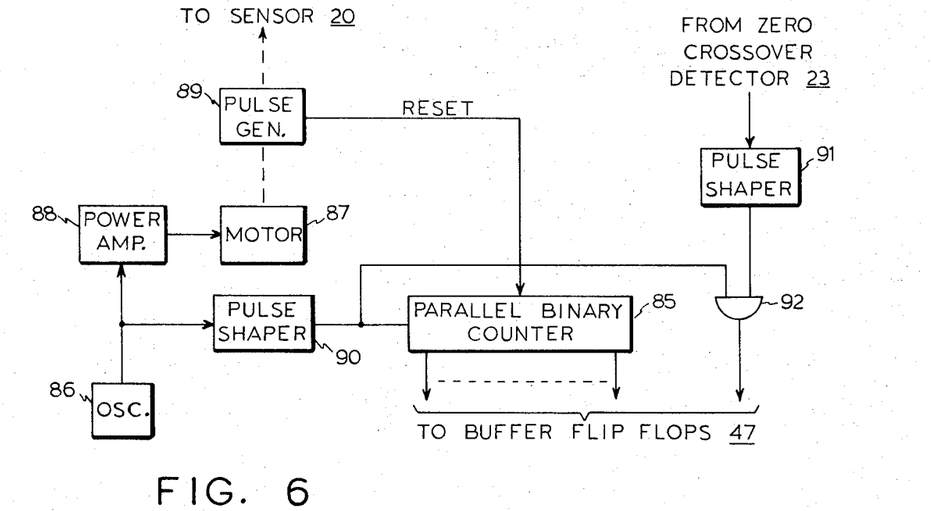
FIG. 6 is a block diagram of an alternative arrangement for periodically producing a heading code in the system of FIG. 1.

Referring now to FIG. 6, an alternative arrangement for obtaining a heading code without the use of a shaft encoder employs a parallel binary counter 85 driven by a sine-wave oscillator 86 that also drives a synchronous motor 87 through a power amplifier 88. The motor drives a pulse generator 89, such as a cam operated switch, and the magnetic sensor (loop) 20. The pulse from the generator 89 resets the counter 85 once per revolution of the sensor. The heading code thus produced by the counter is effectively read into the buffer flip-flops 47 by a pulse from the zero-crossover detector 23 as described with reference to FIG. 4.

The pulse generator 89 is set to produce a pulse at a predetermined reference point relative to the vehicle, and the counter is arranged to count up from zero to, for example, 360 (assuming the sensor is rotated counter clockwise) so that the heading code read out at any given time will correspond directly to the heading of the vehicle. For example, if the vehicle is on a magnetic heading of 30°, as the sensor is rotated counter clockwise from the position at which the counter is reset to zero, the counter will count 30 pulses before the sensor passes through magnetic north. A pulse from the zero-crossover detector then reads out the binary code for the magnetic heading of 30°. This assumes that the motor 87 is adapted to cause the sensor to complete one revolution in 360 cycles of the oscillator 86. That can be assured by the proper use of gears (not shown) between the motor 87 and the sensor.

An advantage of this arrangement is that, when parallel logic is employed to implement the counter, all stages of the flip-flop will change state at the same time so that no ambiguity can occur if the heading is read out as the sensor crosses from one sector into another. The heading read out will be one or the other. To avoid the possibility of trying to read out the heading at the exact moment flip-flops in the counter are changing state, a pulse shaper (saturating amplifier) 90 may be employed to provide a square wave to operate the counter. A pulse shaper 91 may then provide a square pulse from the zero crossover detector having a width just greater than one pulse from the pulse shaper 90. By using the pulse from the shaper 91 to enable an AND gate 92, and adapting the counter to operate off the leading edge of pulses from the pulse shaper 90, while the buffer flip-flops 47 (FIG. 4) operate the trailing edge, it can be assured that the states of the flip-flops in the counter 85 are stable when the heading is read out. In that manner the counter is always read out just before, or just after, it changes state, and never while changing state.

The count of 360 pulses per revolution of the sensor is, of course, arbitrary. For greater heading resolution, twice that many, or ten times that many pulses per revolution can be used. For less resolution, a smaller number of pulses would be used, such as 32 for a resolution equal to that of the first embodiment described. The smaller number would be preferred for most applications because of the smaller number of components necessary to implement the counter and the digital resolver. The counter may even be an up-down counter which counts from zero to eight and back to zero during each half revolution of the sensor 20, and by the use of suitable logic networks, the code of Table I may be provided as the output of such an up-down counter in order to use the sine-cosine logic of FIG. 5.

If the code of Table I is not used in this modification, there will be increased complexity in the digital resolver required to decode the heading code and produce sine and cosine codes, and separate sign signals. However, once these sine and cosine codes are obtained, they can be employed to gate the proper number of pulses to the transistor $Q_1$ and $Q_2$ (FIG. 5). The sine signals would replace the B and A signals which control the inverting and noninverting functions of the transistors.

For most efficient implementation, the heading decoder may consist of two diode matrices, each producing a sine or cosine code and sign signal, and the train of pulses may be a single continuous train at a repetition rate proportional to vehicle speed. The sine and cosine codes could then be used directly in pulse rate multipliers to implement equations (1) and (2).

To generate a continuous train of pulses for use in this modification, the pulse generator 13 may be implemented with only the first two columns of Table II, i.e. with a shaft encoder for just the signals $\phi_1$ and $\phi_2$ applied to the motors 27 and 28 as shown in FIG. 4. The signal $\phi$, could then be used as the pulse train input to the sine and cosine pulse rate multipliers.

Figure 7:
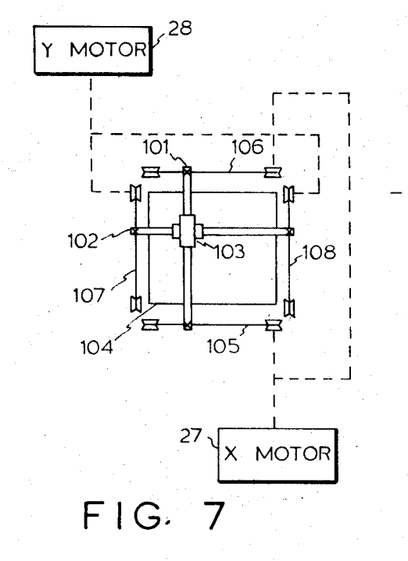
FIG. 7 is a plan view of a plotting device for the system of FIG. 1.

FIG. 7 illustrates schematically an arrangement for implementing the plotting device 12 (FIG. 1) using two cursors (rods) 101 and 102 to position a stylus carriage 103 over a plotting board 104. The carriage may be, for example, two sleeves, one over each of the rods 101 and 102, but connected together by a pin such that they always intersect, but are free to rotate relative to each other. A supporting base and frame (not shown) support the board 104 in a stationary position with respect to pulleys for X and Y - drive chains 105 through 108. The motors 27 and 28 are connected through suitable gear trains (not shown) to one pulley for each chain as indicated by dotted lines representing mechanical linkages.

If the cursors are so attached to the chains that they are perpendicular, horizontal and vertical lines will be traced by the stylus carriage 103 along X and Y plotting axes as the vehicle travels on east or west, and north or south headings, but only if a gyro compass is used or a magnetic compass is properly compensated for distortion of the earth's magnetic field due to the ferromagnetic mass of the vehicle.

Proper compensation of a magnetic compass can be achieved by adjusting the positions of a number of permanent magnets as the vehicle is parked at various headings from 0° to 360° in a manner that is standard for compensating a magnetic compass on a ship. However, the procedure takes a considerable time, and must be repeated from time to time as the permanent magnetization of the vehicle's ferromagnetic mass is altered under the influence of the earth's magnetic field.

Figure 8:
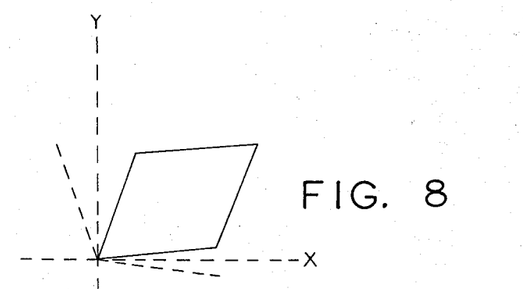
FIG. 8 is a diagram useful in explaining a feature of the exemplary embodiment.
Figure 9:
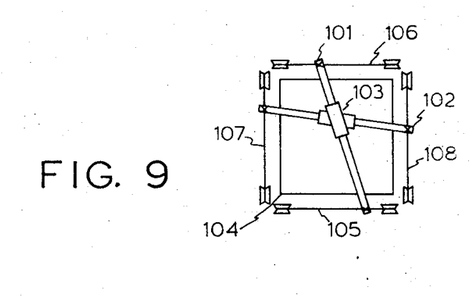
FIG. 9 is a plan view of the plotting device of FIG. 7 adjusted for correction of magnetic compass error.

It has been discovered that a single magnet can be adjusted more easily to cause the plotting of parallel lines for easterly and westerly headings, and parallel lines for northerly and southerly headings. The result will usually be a rhomboid if the vehicle travels in a rectangle on cardinal point headings. That, of course, is not acceptable for plotting a map or tracking the vehicle's position on a map. However, the plotting device can be adjusted to produce a rectangular plot by offsetting the cursors by angles equal and opposite to angles by which the sides of the rhomboid depart from a rectangle, as illustrated in FIG. 9 for the rhomboid of FIG. 8. That can be done by moving the ends of the cursors on the drive chains, or slipping the chains on the pulleys, until the cursors are at the proper angle with respect to the X and Y axes. For the exemplary rhomboid shown in FIG. 8, the new positions of the cursors are indicated by dotted lines. FIG. 9 shows the cursors 101 and 102 at these new positions. When the vehicle then travels on a cardinal-point heading, the line plotted will be parallel to one of the axes.

The magnetic compass is preferably mounted on gimbals, or at least pivoted about a pitch axis so that steep grades will not introduce a compass error by causing the axis of rotation for the compass to depart from a substantially vertical position. The roll angle of a vehicle does not normally vary as much as the pitch angle, but for greater accuracy the magnetic compass should be pivoted about the roll axis also. Damping should also be provided in the usual manner employed for damping a compass mounted on gimbals. A sample weight attached to the bottom of the compass assembly will keep it upright, i.e. will keep its roll and pitch axes normal to the vertical.

If the compass is thus pivoted for at least pitch, apparent foreshortening can be produced in plotting the distance traveled on a chart or map by attaching to the pitch-correcting pivot an arm that contacts one of a plurality of commutating segments in a sector to produce a commutator signal or code. That signal or code is made proportional to the pitch angle, and may therefore be used to further multiply the X and Y train of pulses by the cosine of the pitch angle.

To further improve performance of the system, the magnetic sensor 20 may be mounted at the end of flexible pole made of stainless steel, fiberglass, or the like, thus locating the sensor as far as possible from the magnetic influence of the vehicle. Other improvements, modifications and variations may readily occur to those skilled in the art. Consequently, although particular embodiments of invention have been described and illustrated herein, it is intended that the claims be interpreted to cover such improvements, modifications and variations.

What is claimed is:

1. In a system for tracking a land vehicle on a display system using Cartesian coordinates, the combination of
   a compass and means responsive to said compass for providing heading data directly in digital form of said vehicle,
   a pulse generator coupled directly to the drive system of said vehicle to continually produce a group of pulses representing a unit distance traveled,
   digital computing means for resolving said group of pulses into X and Y trains of pulses by continually multiplying said group of pulses from said pulse generator by a function of said compass heading data, thereby producing said X and Y trains of pulses proportional to the vector components of the distance traveled by said vehicle for plotting in a Cartesian coordinate system, and
   means for seperately integrating said X and Y trains of pulses, thereby continually updating Cartesian coordinate data.

2. A system for continually updating the Cartesian coordinates of a land vehicle from a starting point in a given geographic area as said vehicle travels through said area, comprised of
   means for continually producing a heading code in digital form corresponding to the heading of said vehicle, said code having two sign bits A and B, where said bit A is a positive sign for any northerly heading from 270° to 90°, and a negative sign for any southerly heading from 90° to 270°, and said bit B is a positive sign for any easterly heading from 0° to 180°, and a negative sign for any westerly heading from 180° to 0°, and where said code includes a plurality of additional bits, C, D . . . for designating: a number of successive equally spaced headings from 0° to 90° with successively increasing code numbers, an equal number of equally spaced headings from 90° to 180° with successively decreasing code numbers, and a duplication of successively increasing and then decreasing code numbers from 180° through 270° to 0°,
   means for continually generating pulses representing distance traveled by said vehicle,
   digital means responsive to said heading code and to said pulses for producing
   two pulse trains of pulses approximately according to the equations
   $|\Delta X| = \Delta D |\sin \theta|$
   $|\Delta Y| = \Delta D |\cos \theta|$
      where $\theta$ is the heading angle represented by said code bits C, D . . . , $\Delta D$ is the number of pulses produced by said pulse generating means in an increment of time, and $\Delta X$ and $\Delta Y$ are the number of pulses resolved into said two trains during said increment of time,
   means responsive to said heading code bit B for integrating said $\Delta X$ pulses to provide a number of integrated $\Delta X$ pulses equal to the product $\Delta D \sin \theta$ by effectively adding $\Delta X$ pulses when said code bit B is positive, and subtracting $\Delta X$ pulses when said code bit B is negative, and
   means responsive to said heading code bit A for integrating said $\Delta Y$ pulses to provide a number of integrated $\Delta Y$ pulses equal to the product $\Delta D \cos \theta$ by effectively adding $\Delta Y$ pulses when said code bit A is positive, and subtracting $\Delta Y$ pulses when said code bit A is negative.

3. A system as defined in claim 2 wherein said last two named means each includes a bidirectional integrating device for adding pulses of one polarity and subtracting pulses of opposite polarity, and a junction transistor having its base connected to receive pulses to be integrated of a given polarity, its collector connected to receive one of said sign bits A and B directly, and its emitter connected to receive the complement of one of said bits A and B through a resistor, and means for coupling said bidirectional integrating device to said emitter, whereby said transistor functions as a non-inverting coupler for pulses to be integrated when said one of said sign bits is of a given polarity and an inverting coupler for pulses to be integrated when said one of said sign bits is of a polarity opposite said given polarity.

4. Apparatus as defined in claim 3 wherein said digital means for producing said trains of pulses $\Delta X$ and $\Delta Y$ includes decoding means responsive to said code bits C, D . . . representing the heading angle $\theta$ for producing codes representing the values of $|\sin \theta|$ and $|\cos \theta|$, and pulse rate multiplying means for producing from said pulses $\Delta D$ said train of pulses $\Delta X$ and $\Delta Y$ as products of said pulses $\Delta D$ and said codes representing values of $|\sin \theta|$ and $|\cos \theta|$.

5. In a system for tracking a vehicle using linear coordinates, the combination of
   a compass and means for providing heading data of said vehicle directly in digital form from said compass, a pulse generator coupled to a drive train of said vehicle to directly produce a train of pulses representing distance traveled, digital computing means for resolving said train of pulses into two trains of pulses by multiplying said train of pulses from the pulse generating means by a function of said compass heading data, thereby producing said two trains of pulses representing vector components of the distance traveled in a linear coordinate system, and means for separately counting or integrating said two trains of pulses, thereby producing said linear coordinates.

6. Apparatus, for continually updating Cartesian coordinates of a land vehicle from a starting point in a given geographic area as said vehicle changes its position in said area, comprised of a rotating magnetic-compass means for producing a sinusoidal signal which crosses zero, from a voltage of a given polarity with respect to a reference, once per revolution at a predetermined point in the revolution in relation to magnetic north, code means operated in synchronism with said magnetic-compass means for producing a cyclic heading code having one code cycle per revolution of said compass means, the output of said cyclic code means always being zero when said rotating compass means is at a predetermined point in the direction of travel of said vehicle, whereby said heading code always corresponds to the heading of said vehicle relative to said magnetic north direction when said sinusoidal signal crosses zero from a voltage of said given polarity, means for detecting when said sinusoidal signal crosses zero from a voltage of said given polarity, buffer storage means for receiving and storing a heading code from said code means under control of said detecting means when said sinusoidal signal crosses zero from a voltage of said given polarity, means for continually producing pulses of a number proportional to distance traveled by said vehicle, means for resolving said pulses into two trains of pulses approximately according to the equations $\Delta X = \Delta D \sin \theta$
$\Delta Y = \Delta D \cos \theta$ where $\theta$ is the heading angle represented by said code, $\Delta D$ is the number of pulses produced by said pulse generating means in an increment of time, and $\Delta X$ and $\Delta Y$ are the numbers of pulses resolved into said two trains during said increment of time, and means for integrating separate said two trains of pulses $\Delta X$ and $\Delta Y$ thereby continually updating said Cartesian coordinates.

7. Apparatus as defined in claim 6 wherein said code means comprises a shaft encoder driven in synchronism with said compass means for producing a heading code in digital form corresponding to the heading of said vehicle, said code having two sign bits A and B, where said bit A is a positive sign for any northerly heading from 270° to 90°, and a negative sign for any southerly heading from 90° to 270°, and said bit B is a positive sign for any easterly heading from 0° to 180°, and a negative sign for any westerly heading from 180° to 0°, and where said code includes a plurality of additional bits C, D, . . . for designating: a number of successive equally spaced headings from 0° to 90° with successively increasing code numbers, an equal number of equally spaced headings from 90° to 180° with successively decreasing code numbers, and a duplication of successively increasing and then decreasing code numbers from 180° through 270° to 0°, and wherein said resolving means is comprised of digital means responsive to said heading code and to said pulses for producing two pulse trains of pulses approximately according to the equations $|\Delta X| = \Delta D \, |\sin \theta|$
$|\Delta Y| = \Delta D \, |\cos \theta|$ where $\theta$ is the heading angle represented by said code bits C, D . . . , $\Delta D$ the number of pulses produced by said pulse generating means in an increment of time, and $\Delta X$ and $\Delta Y$ are the number of pulses resolved into said two trains during said increment of time, and means responsive to said heading code bits A and B for integrating said Y and X pulses in positive and negative directions according to the signs represented by said code bits A and B.

8. Apparatus as defined in claim 7 wherein said last named means includes for each of said trains of $\Delta X$ and $\Delta Y$ pulses a bidirectional integrating device for adding pulses of one polarity and subtracting pulses of opposite polarity, and a junction transistor having its base connected to receive pulses to be integrated of a given polarity, its collector connected to receive one of said sign bits A and B directly, and its emitter connected to receive the complement of one of said bits A and B through a resistor, and means for coupling said bidirectional integrating device to said emitter, whereby said transistor junctions as a noninverting coupler for pulses to be integrated when said one of said sign bits is of a given polarity opposite said given polarity.

9. Apparatus as defined in claim 8 wherein said digital means for producing said trains of pulses $\Delta X$ and $\Delta Y$ includes decoding means responsive to said code bits C, D . . . representing the heading angle $\theta$ for producing codes representing the values of $|\sin \theta|$ and $|\cos \theta|$, and pulse rate multiplying means for producing from said pulses $\Delta D$ said train of pulses $\Delta X$ and $\Delta Y$ as products of said pulses D and said codes representing values of $|\sin \theta|$ and $|\cos \theta|$.

10. Apparatus as defined in claim 6 where said means for integrating said trains of pulses $\Delta X$ and $\Delta Y$ is comprised of a plotting device having first and second cursors driven in respective X and Y directions with means for plotting carried at the intersection of said cursors, each of said cursors being driven by two drive chains, one at each end, each drive chain going around two pulley at least one of which is driven, said cursors being adjustable in angle relative to X and Y axis of said plotting device through said drive chains to compensate for any deviations of east-west and north-south plots from positions parallel to said X and Y axes, respectively, by offsetting said cursors in respective directions opposite any deviations from positions parallel to said X and Y axes after a single magnet has been adjusted in said magnetic compass means to compensate for magnetic compass error due to ferromagnetic mass of said vehicle by so positioning said magnet in said magnetic compass means as to cause parallel lines to be plotted on east and west and parallel lines to be plotted on north and south headings.

11. In a system for continually plotting Cartesian coordinates of a moving vehicle using: an X-Y plotting device having two crossed cursors which carry a stylus at the intersection thereof, a magnetic compass for producing a heading signal, means for obtaining a signal representing distance traveled by said vehicle, and a resolver for obtaining from said heading and distance signals two signals according to the equations $\Delta X = \Delta D \sin \theta$
$\Delta Y = \Delta D \cos \theta$ where $\Delta D$ is an increment of distance traveled, $\theta$ is the angle represented by said heading signal, and $\Delta X$ and $\Delta Y$ are said two signals employed separately to drive said two cursors in X and Y directions of said plotting device, a method for compensating compass error due to the ferromagnetic mass of said vehicle by adjusting the position of compensating magnetic means near said magnetic compass such that, when said vehicle travels in a rectangle on cardinal magnetic headings, a rhomboid is plotted, and adjusting said cursors in said plotting device at angles with respect to X and Y axes thereof equal but opposite in direction to angles by which corresponding sides of said rhomboid depart from lines parallel to said X and Y axes.

* * * * *